(12) United States Patent (10) Patent No.: US 8,698,599 B2
Kanemoto et al. (45) Date of Patent: Apr. 15, 2014

(54) READER/WRITER, COMMUNICATION PROCESSING DEVICE, COMMUNICATION PROCESSING METHOD, DATA MANAGEMENT SYSTEM AND COMMUNICATION SYSTEM

(75) Inventors: Toshinori Kanemoto, Kanagawa (JP); Teiichi Shiga, Chiba (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 12/423,412

(22) Filed: Apr. 14, 2009

(65) Prior Publication Data

US 2009/0261952 A1 Oct. 22, 2009

(30) Foreign Application Priority Data

Apr. 16, 2008 (JP) ................................. 2008-107224

(51) Int. Cl.
*H04Q 5/22* (2006.01)
(52) U.S. Cl.
USPC ...... 340/10.1; 340/10.3; 340/10.5; 340/572.1
(58) Field of Classification Search
USPC ................ 340/10.1, 10.3, 10.5, 10.51, 10.52, 340/572.1; 235/492; 365/192, 230.09; 711/176, 209
See application file for complete search history.

(56) References Cited

U.S. PATENT DOCUMENTS

| 5,339,402 | A  | * | 8/1994  | Ueda ............................ | 711/220 |
| 2001/0037439 | A1 | * | 11/2001 | Ully ............................ | 711/212 |
| 2003/0128124 | A1 | * | 7/2003  | Amtmann et al. ............ | 340/592 |
| 2006/0091200 | A1 |   | 5/2006  | Lai et al. |  |
| 2007/0069865 | A1 | * | 3/2007  | Akiyama et al. ............. | 340/10.2 |

FOREIGN PATENT DOCUMENTS

| JP | 04-352045 | 12/1992 |
| JP | 06-119508 | 4/1994 |
| JP | 10-063580 | 3/1998 |
| JP | 10-240631 | 9/1998 |
| JP | 2003-162433 | 6/2003 |
| JP | 2004-192426 | 7/2004 |
| JP | 2006-079202 | 3/2006 |
| JP | 2006-119954 | 5/2006 |
| JP | 2007-094954 | 4/2007 |
| JP | 2008-027070 | 2/2008 |
| JP | 2008-047042 | 2/2008 |
| WO | 2004-023385 | 3/2004 |

OTHER PUBLICATIONS

Everett, "Smart Card Tutorial—Introduction to Smart Cards", Nov. 1994 pp. 1-163.*
Japanese Office Action issued on Jul. 27, 2010 corresponding to Japanese Patent Appln. No. 2008-107224.
European Search Report dated Oct. 15, 2009 for corresponding European Application No. 09004731.7.
Japanese Office Action issued on Feb. 23, 2010, for corresponding JP2008-107224.

* cited by examiner

*Primary Examiner* — Edwin Holloway, III
(74) *Attorney, Agent, or Firm* — K&L Gates LLP

(57) ABSTRACT

A communication processing device includes a control unit for, when receiving an address update request signal including a segment identifier for identifying a segment address of a recording unit from a reader/writer, holding the segment identifier in a RAM, and when receiving a readout request signal including an offset address having the segment as a reference from the reader/writer, transmitting to the reader/writer data recorded in a region specified by an address having the offset address contained in the readout request signal as offset with the segment address identified in the segment identifier as a reference of the regions of the recording unit.

6 Claims, 14 Drawing Sheets

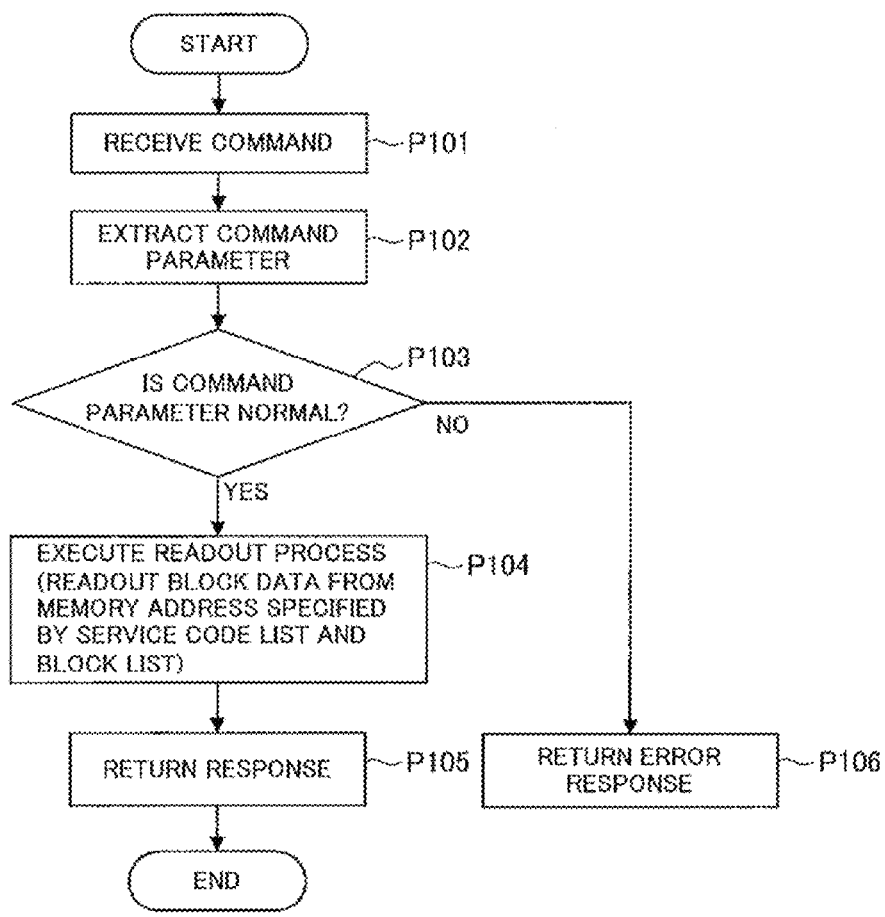

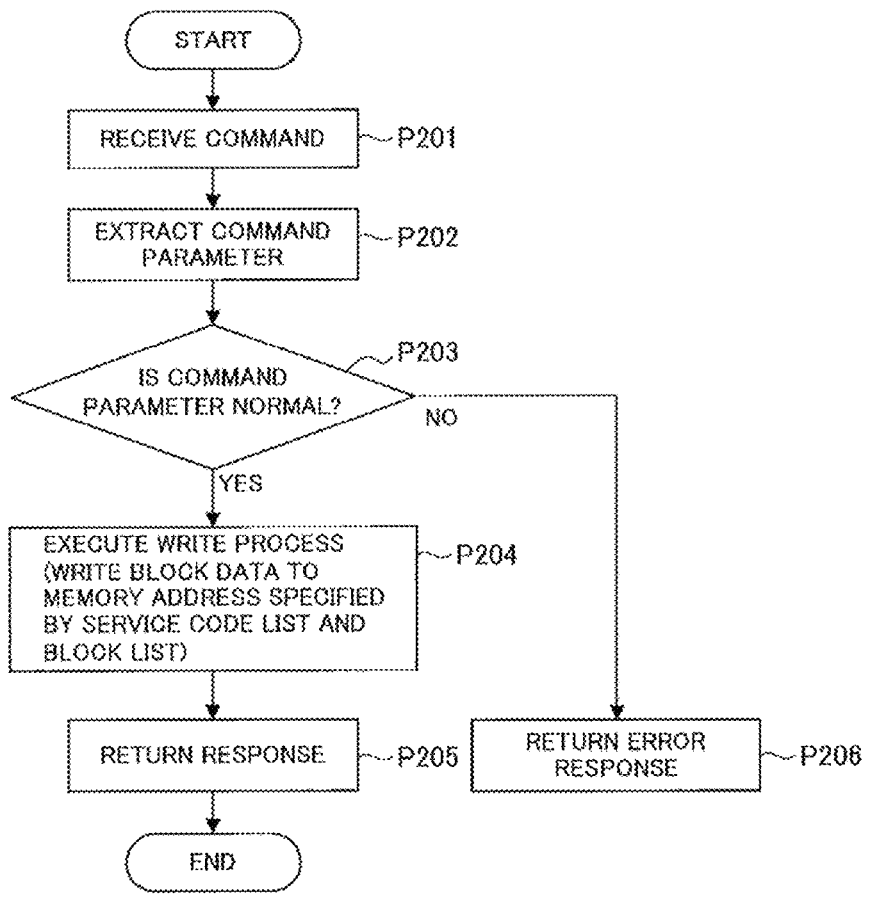

FIG.12A

ADDRESS UPDATE
REQUEST(Update_Req)

| REQUEST IDENTIFIER | COMMUNICATION ID (IDm) | MEMORY SEGMENT IDENTIFIER |
|---|---|---|

FIG.12B

ADDRESS UPDATE
RESPONSE(Update_Res)

| RESPONSE IDENTIFIER | COMMUNICATION ID (IDm) | RESULT CODE (SF) |
|---|---|---|

READER/WRITER, COMMUNICATION PROCESSING DEVICE, COMMUNICATION PROCESSING METHOD, DATA MANAGEMENT SYSTEM AND COMMUNICATION SYSTEM

CROSS REFERENCES TO RELATED APPLICATIONS

The present application claims priority to Japanese Patent Application JP 2008-107224 filed in the Japan Patent Office on Apr. 16, 2008, the entire contents of which is being incorporated herein by reference.

BACKGROUND

The present application relates to a reader/writer, a communication processing device, a communication processing method, a data management system and a communication system. More specifically, the present application relates to a technique of reading out data from a data management device.

Electronic devices such as CE (Consumer Electronics) devices, portable terminals, and electronic toys are assumed for the shape of an IC (Integrated Circuit) card. The data management system of the IC card and the like having such shape is configured to include, as constituent elements, a communication processing device including an LSI (Large Scale Integration) and the like responsible for communication processing, and a data management device including an LSI and the like responsible for data management.

In such configuration, the communication processing device first accepts a readout request from a reader/writer. The communication processing device holds the address specified in the readout request in its memory, reads out the data from a region corresponding to the held address of the regions of the memory of the data management device, and returns the read out data to the reader/writer (see e.g., Japanese Patent Application Laid-Open No. 2007-094954 and Japanese Patent Application Laid-Open No. 10-240631).

[Patent Document 1] Japanese Patent Application Laid-Open No. 2007-094954

[Patent Document 2] Japanese Patent Application Laid-Open No. 10-240631

SUMMARY

However, if the memory of the communication processing device is small, the data transmitted and received between the reader/writer and the communication processing device becomes small. In such case, the type of address that can be specified in the readout request transmitted from the reader/writer is few. Furthermore, in such state, the region corresponding to the address specified in the readout request of the memory regions of the data management device is also narrow. In other words, data can be read out from only a limited region of the memory of the data management device.

The present application addresses the above-identified, and other issues associated with methods in related art and apparatuses, and it is desirable to provide a new and improved technique in which the reader/writer can read out data from a region of wider range when reading out the data from the memory of the data management device through the communication processing device.

According to an embodiment, there is provided a communication processing device including an antenna for transmitting and receiving signals with a reader/writer; and a control unit for, when receiving an address update request signal including a segment identifier for identifying a segment address of a recording unit of a data management device, which includes the recording unit recorded with data, via the antenna from the reader/writer, holding the segment identifier in a memory, and when receiving a readout request signal including an offset address having the segment address as a reference via the antenna from the reader/writer, transmitting to the reader/writer data recorded in a region specified by an address having the offset address contained in the readout request signal as offset with the segment address identified in the segment identifier as a reference of the regions of the recording unit.

According to an embodiment described above, there can be provided a technique in which the reader/writer can read out data from a region of wider range when reading out data from the memory of the data management device through the communication processing device.

Additional features and advantages are described herein, and will be apparent from the following Detailed Description and the figures.

BRIEF DESCRIPTION OF THE FIGURES

FIG. 5 is a view showing a configuration example of a readout request and a readout response;

FIG. 6 is a flowchart showing the flow of the readout request processing in a typical communication system;

FIG. 7 is a view showing a configuration example of a write request and a write response;

FIG. 8 is a flowchart showing the flow of the write request processing in a typical communication system;

FIG. 12 is a view showing a configuration of an address update request according to an embodiment;

DETAILED DESCRIPTION

Hereafter, the present application will be described in detail with reference to the appended drawings according to an embodiment.

Figure 1:
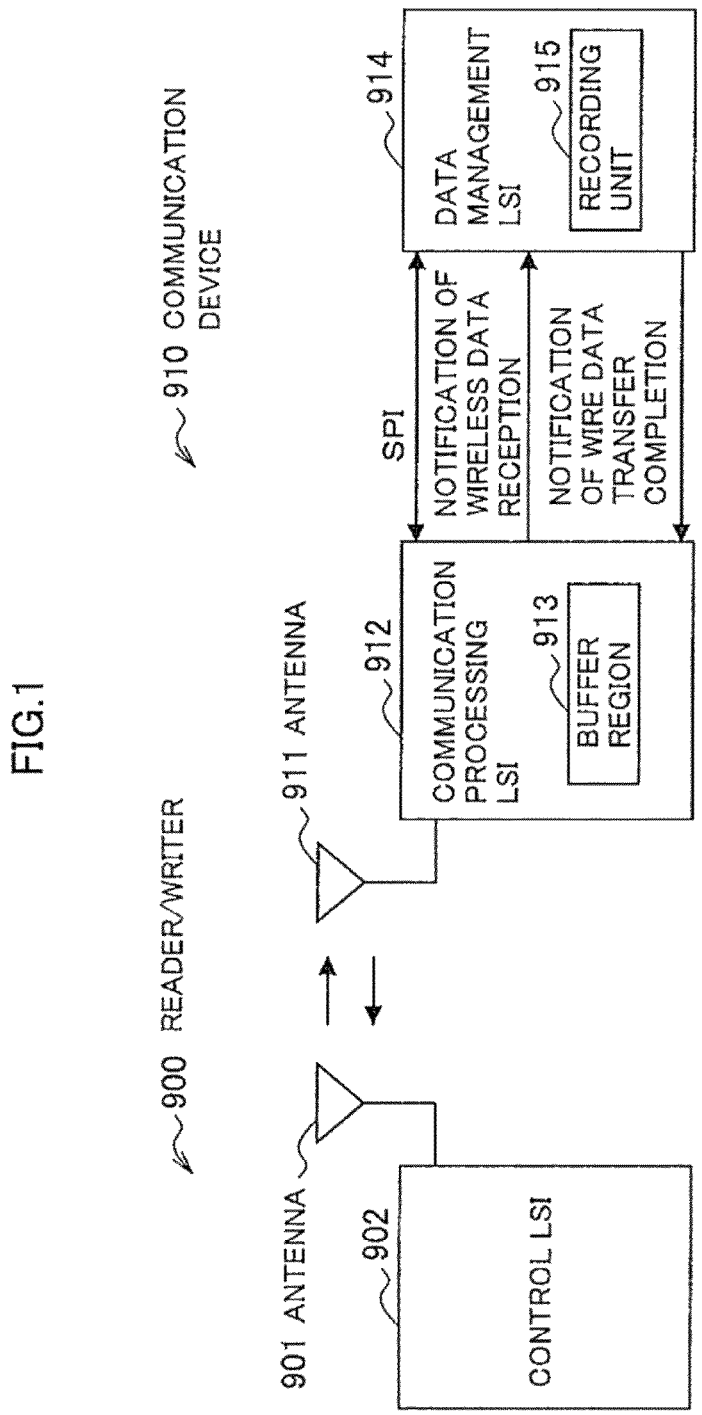
FIG. 1 is a view showing a configuration of a communication system with a non-contact communication technique according to one embodiment.

FIG. 1 is a view showing a configuration of a communication system with a non-contact communication technique according to one embodiment. The configuration of a typical communication system according to one embodiment will be described with reference to FIG. 1.

A communication device 910 shown in FIG. 1 is an electronic device having a non-contact IC card interface function according an embodiment, and is, for example, various CE (Consumer Electronics) devices such as television and digital camera having the non-contact IC card interface function according to an embodiment. The communication device 910 includes at least two LSIs (communication processing LSI 912 and data management LSI 914), which are wire connected. An interface such as SPI (Serial Peripheral Interface) is used for the interface terminal of the wire connection, and the SPI is provided for data transmission and reception between the two LSIs, that is, wireless data reception notification from the communication processing LSI 912 to the data management LSI 914 and wire data transfer completion notification from the data management LSI 914 to the communication processing LSI 912. The two LSIs (communication processing LSI 912 and data management LSI 914) operate by a power supply (not shown) in the communication device 910 (configured by antenna 911, communication processing LSI 912, and data management LSI 914). The data management LSI 914 acts as a master IC and the communication processing LSI 912 acts as a slave IC, and the SPI operates by a clock generated by the master IC.

The communication processing LSI 912 equipped with the antenna 911 incorporates a buffer region 913 (RAM: Random Access Memory) used as a communication buffer, and performs transmission and reception of wireless command, and cutout of packet data.

The reader/writer 900 does not have the data management function, and the communication processing LSI 912 requests for write out and acquisition of data to the data management LSI 914 when a control LSI 902 of the reader/writer 900 makes an access to the data through an antenna 901.

In such configuration, notification and data transmission with respect to the data management LSI 914 are desired when updating the data managed by the data management LSI 914. When reading out the data managed by the data management LSI 914 by a readout request (Read_Req), the speed of the communication can be increased by setting the data to be read in the buffer region 913 (RAM) of the communication processing LSI 912 in advance.

However, if the amount of information recorded in a recording unit 915 (NVM) of the data management LSI 914 is large compared to the buffer region 913 (RAM) of the communication processing LSI 912, the range of data that can be read out by the readout request (Read_Req) is limited in accordance with the communication buffer size.

Figure 2:
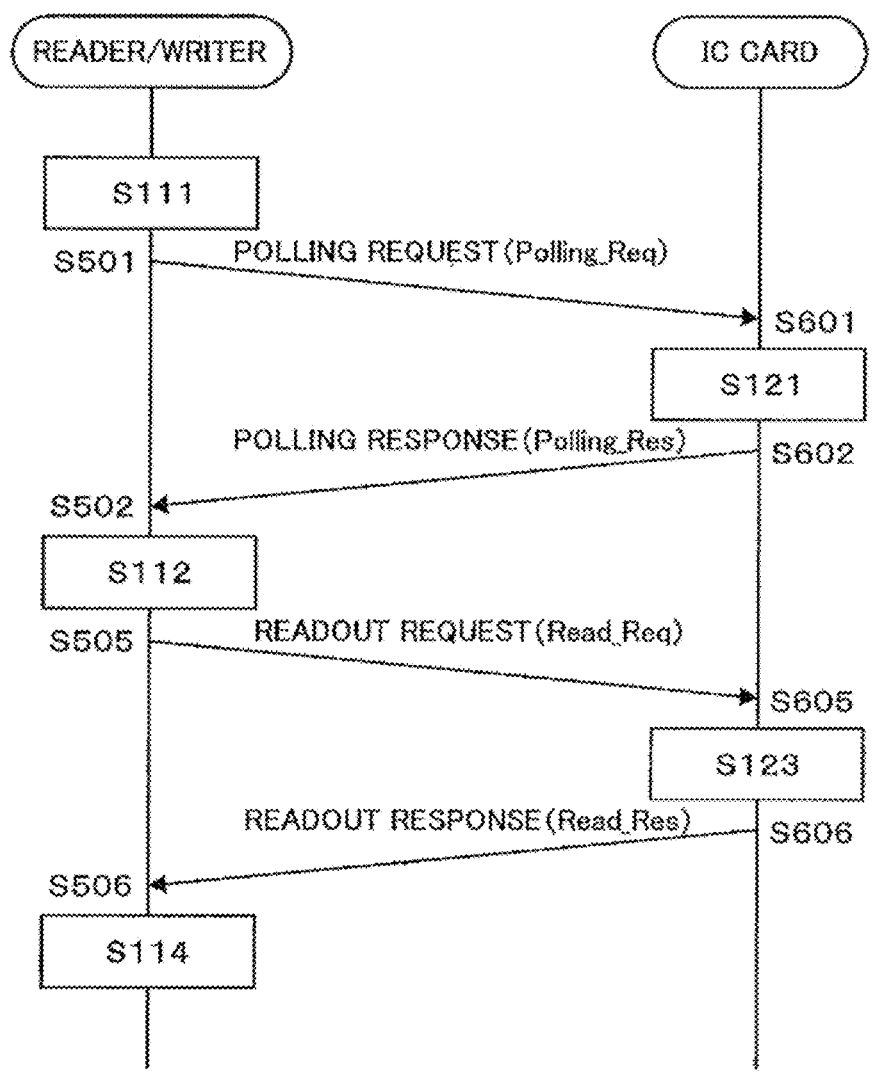
FIG. 2 is a view showing an encrypted communication procedure of a typical communication system.

FIG. 2 is a view showing an encrypted communication procedure of the typical communication system. The encrypted communication procedure of the typical communication system will be described with reference to FIG. 2.

The reader/writer 900 radiates electric wave (electromagnetic wave), and detects the IC card 910 by performing processing such as polling. The request signal for data communication includes, for example, a request signal (Read_Req) for requesting transmission of arbitrary data and a request signal (Write_Req) for requesting overwrite of arbitrary data from the reader/writer 900 to the IC card 910. The readout request (Read_Req) is issued to the IC card 910 by the reader/writer 900. The IC card 910 receiving such request specifies the data to be read out according to an instruction of the readout request (Read_Req), reads the data from the recording unit 915 (NVM), and returns the read out data to the reader/writer 900 by including it in the parameter of the readout response (Read_Res).

Figure 3:
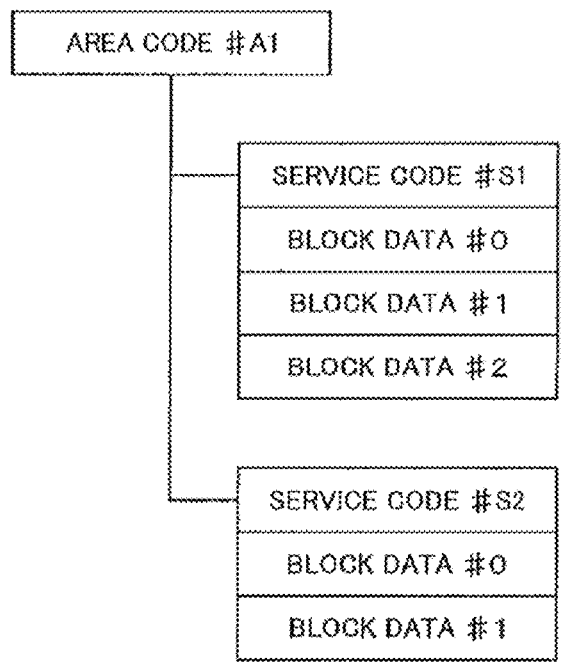
FIG. 3 is a view showing a configuration example of the data to be read out in the communication system.

FIG. 3 is a view showing a configuration example of the data to be read out in the communication system. The configuration example of the data to be read out in the communication system will be described with reference to FIG. 3.

The data to be read out is specified by a service code list and a block list. The service code is an identifier assigned according to the access attribute of the data. Each data is stored in units of fixed length called a block, where a plurality of blocks is stored with respect to the service code, as shown in FIG. 3. When specifying certain data, the data is specified in a form of a certain block number with respect to a certain service code. The service code list is a list of service codes.

Figure 4:
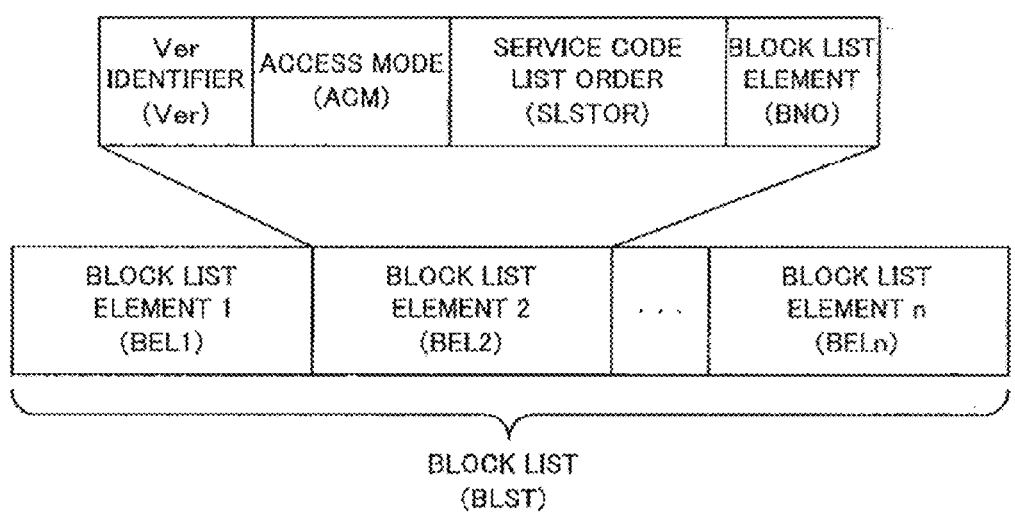
FIG. 4 is a view showing a configuration example of a block list.

FIG. 4 is a view showing a configuration example of a block list. The configuration example of the block list will be described with reference to FIG. 4.

As shown in FIG. 4, the block list is defined as a list of a plurality of block list elements. Each block list element is configured by a Ver identifier (Ver) for version identification of the block list itself, an access mode (ACM) for specifying the access method, a service code list order (SLSTOR) for specifying the listing order of the service code list, and a block number (BNO).

In such configuration, the service code and the block number are provided as information for specifying the block, but the field length of such values is defined by standard and specification. For instance, in a certain product specification, the service code has a length of two bytes, and the block number has a length of one byte. In this case, the block address that can be specified with a certain service code has 256 ways, and the service code that can be specified is 65536 ways.

According to an embodiment, even if the range of the target data that can be read out with the readout request (Read_Req) is limited by the restriction of the field length of the block number, the switching of the memory segment can be instructed by sending an address update request (Update_Req) before the readout request (Read_Req) so that data can be read out from a region beyond the limited range.

FIG. 5 is a view showing a configuration example of a readout request and a readout response. The readout request (Read_Req) and the readout response (Read_Res) are defined, for example, by the structure shown in FIG. 5.

FIG. 6 is a flowchart showing the flow of the readout request processing in a typical communication system. The readout request processing in the typical communication system will be described with reference to FIG. 6.

As shown in FIG. 6, in the readout request (Read_Req) process in the typical communication system, the IC card 910 checks the validity of the command parameter from the reader/writer 900, and thereafter, reads out the block data from the memory address (of the recording unit 915) specified by the service code list and the block list of the command parameter, and returns the same as the parameter of the readout response (Read_Req) to the reader/writer 900.

The present embodiment aims to enable data reading of the block number space (address space) of a wider range without changing the structure of the command parameter of the readout request (Read_Req) of such system.

FIG. 7 is a view showing a configuration example of a write request and a write response. The write request (Write_Req) and the write response (Write_Res) are defined, for example, by the structure shown in FIG. 7.

FIG. 8 is a flowchart showing the flow of the write request processing in a typical communication system. The write request processing in the typical communication system will be described with reference to FIG. 8.

As shown in FIG. 8, the write request (Write_Req) in the typical communication system is issued by the reader/write 900 to the IC card 910, and the IC card 910 receiving such request checks the validity of the command parameter, and thereafter, writes the block data (DATA) to the memory address (of the recording unit 915) specified by the service code list and the block list of the command parameter, and returns the write response (Write_Res) to the reader/writer 900.

Figure 9:
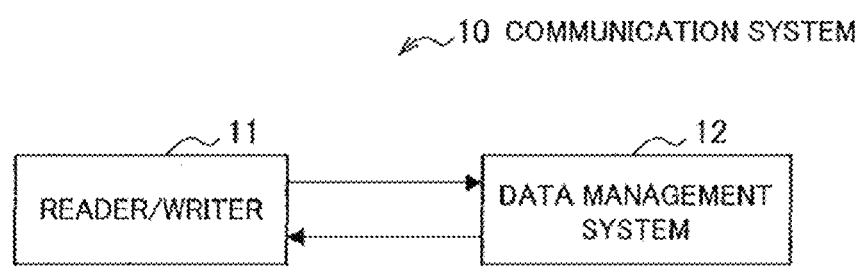
FIG. 9 is a view showing a configuration of a communication system according to an embodiment.

FIG. 9 is a view showing a configuration of a communication system according to a embodiment. The configuration of the communication system according to the present embodiment will be described with reference to FIG. 9.

As shown in FIG. 9, the communication system 10 includes a reader/writer 11 and a data management system 12, which reader/writer 11 and the data management system 12 are configured to be communicable. The data management system 12 manages data, and the reader/writer 11 performs read and write with respect to the data managed by the data management system 12. Transmission and reception of data is performed in a non-contact manner using electromagnetic wave between the reader/writer 11 and the data management system 12.

Figure 10:
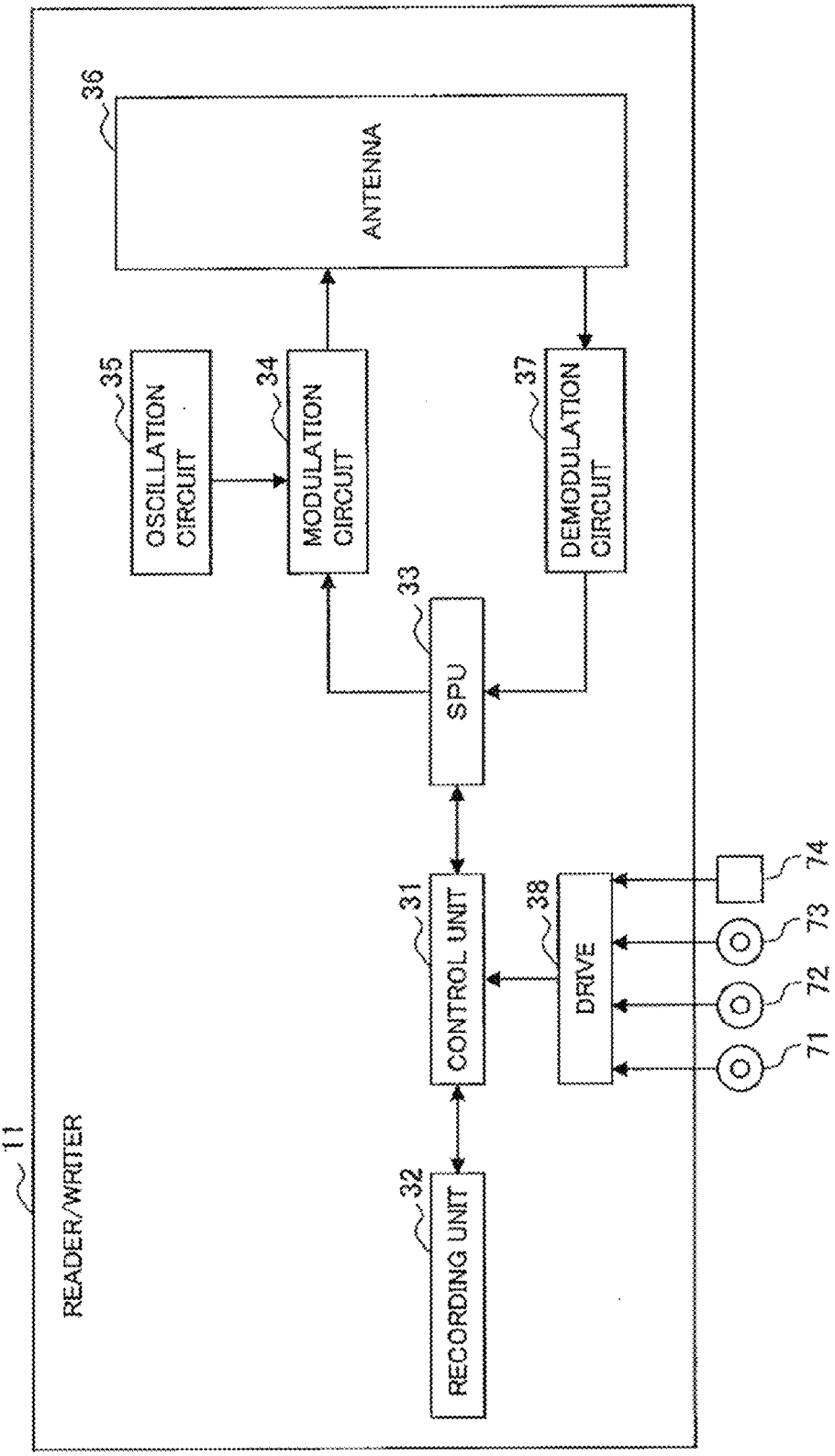
FIG. 10 is a block diagram showing a function configuration of the reader/writer according to an embodiment.

FIG. 10 is a block diagram showing a function configuration of the reader/writer according to the present embodiment. The function configuration of the reader/writer according to an embodiment will be described with reference to FIG. 10.

The reader/writer 11 is configured to include a control unit 31, a recording unit 32, an SPU (Signal Processing Unit) 33, a modulation unit 34, an oscillation circuit 35, an antenna 36, a demodulation unit 37, and a drive 38.

The control unit 31 generates a request signal requesting for overwrite of the data including predetermined data. The control unit 31 also generates a request signal requesting for transmission of the predetermined data.

The control unit 31 generates an address update request signal including a segment identifier for identifying the segment address of the recording unit 112 of the data management device 14, and transmits the request to a communication processing device 13 via an antenna 101. Thereafter, the control unit 31 generates a readout request signal including an offset address having the segment address identified in the segment identifier as the reference, and transmits the request to the communication processing device 13 via the antenna 101.

The control unit 31 generates data to store in the request signal requesting for the overwrite of the data. The control unit 31 generates the request signal requesting for the overwrite of the data, and provides the generated request signal to the SPU 33.

The control unit 31 reads the program provided from the drive 38 attached, as necessary, and executes the read program. When the program and the data are provided from the drive 38, the control unit 31 provides the provided program and data to the recording unit 32, as necessary, reads the program recorded in the recording unit 32, and executes the read program.

The recording unit 32 is a so-called rewritable non-volatile storage medium or a recording medium capable of holding the recorded content even if the power is disconnected, and is configured, for example, by hard disc or flash memory. The recording unit 32 records various data. The recording unit 32 also provides the recorded data to the control unit 31, as necessary.

The SPU 33 codes the request signal provided from the control unit 31 through a predetermined method, and provides the coded request signal to the modulation unit 34. The SPU 33 decodes the response signal provided from the demodulation unit 37 through a method corresponding to the coding method of the response signal, and provides the decoded response signal to the control unit 31.

For instance, when the request signal to be transmitted for the data management system 12 is provided from the control unit 31, the SPU 33 performs a coding process such as coding to a Manchester code on the request signal, and outputs the obtained signal to the modulation unit 34. When the response signal from the data management system 12 is provided from the demodulation unit 37, the SPU 33 performs a decoding process such as decoding of the Manchester code on such data, and provides the obtained signal to the control unit 31.

The modulation unit 34 generates a carrier wave based on the clock signal of a predetermined frequency provided from the oscillation circuit 35. The modulation unit 34 modulates the request signal provided from the SPU 33 through the predetermined method based on the carrier wave to generate a request signal, and provides the modulated request signal to the antenna 36. For instance, the modulation unit 34 generates a modulated request signal by changing the phase, amplitude, frequency, and the like of the carrier wave based on the request signal provided from the SPU 33.

More specifically, the modulation unit 34 ASK (Amplitude Shift Keying) modulates the data provided by the SPU 33 with the clock signal having a frequency of 13.56 MHz provided from the oscillation circuit 35 as the carrier wave, and outputs the generated modulation wave to the antenna 36 as electromagnetic wave.

The oscillation circuit 35 generates the clock signal of a predetermined frequency that becomes a reference, and provides the generated clock signal to the modulation unit 34.

The antenna 36 transmits the request signal provided from the modulation unit 34 to the data management system 12 by wireless communication. In other words, the antenna 36 radiates electric wave for transmitting the request signal provided from the modulation unit 34. The antenna 36 receives the response signal transmitted from the data management system 12, and provides the received response signal to the demodulation unit 37.

The demodulation unit 37 demodulates the response signal provided from the antenna 36 through a demodulation method corresponding to the modulation method of the modulation unit 109 (see FIG. 11), and provides the demodulated response signal to the SPU 33. For instance, the demodulation unit 37 demodulates the modulation wave (ASK modulation wave) acquired through the antenna 36, and outputs the demodulated response signal to the SPU 33.

When a magnetic disc 71, an optical disc 72, a magneto-optical disc 73, or a semiconductor memory 74 is attached, the drive 38 drives the same to acquire the recorded program, data and the like. The acquired program and data are transferred to the control unit 31 or the data management system 12. The program transferred (transmitted) to the data management system 12 is recorded or executed, as necessary, by the data management system 12.

Figure 11:
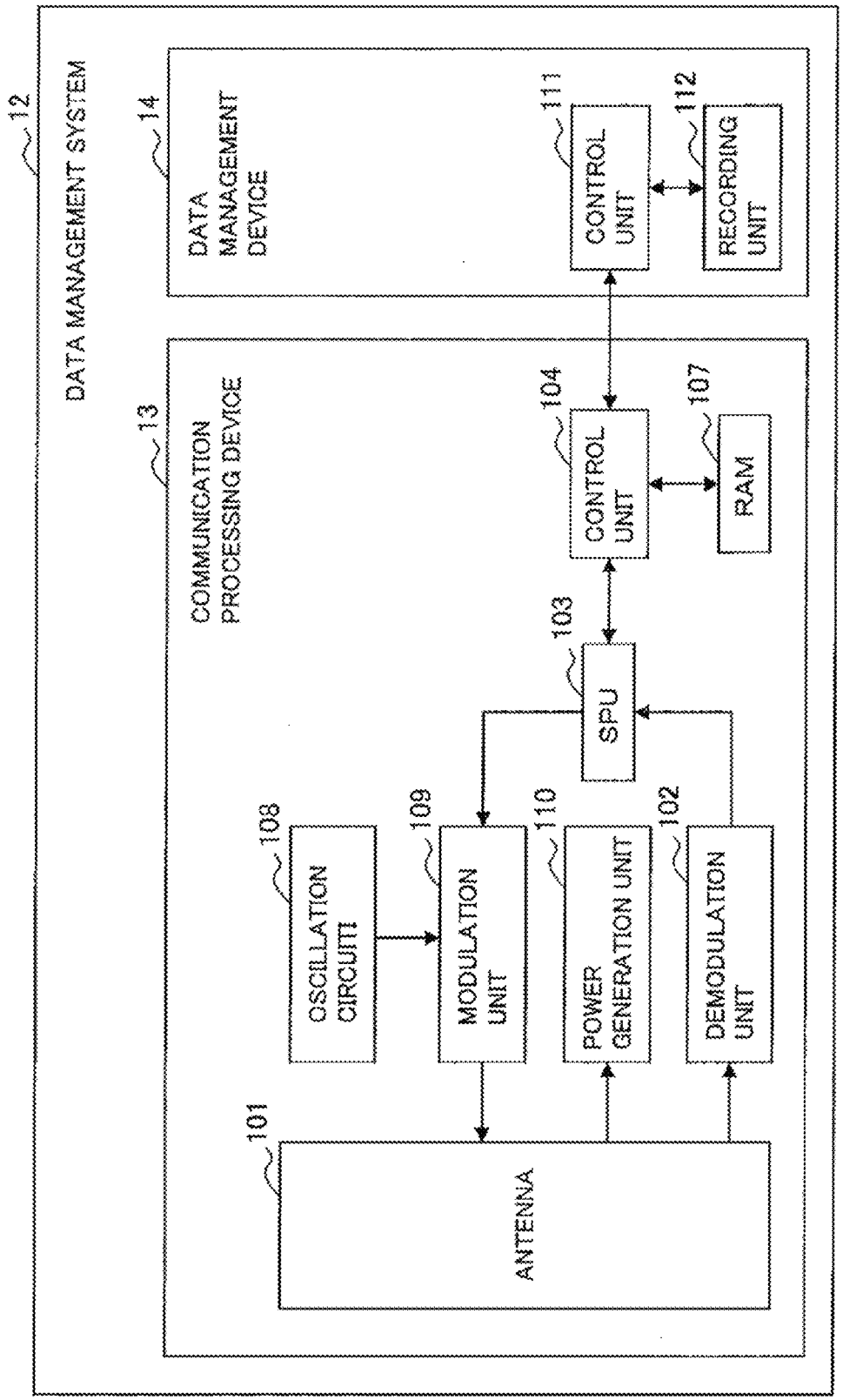
FIG. 11 is a block diagram showing a function configuration of the data management system according to an embodiment.

FIG. 11 is a block diagram showing a function configuration of the data management system according to the present embodiment. The function configuration of the data management system according to an embodiment will be described with reference to FIG. 11.

The data management system 12 is configured to include the communication processing device 13 and the data management device 14. The communication processing device 13 is configured to include the antenna 101, a demodulation unit 102, a SPU 103, a control unit 104, a RAM (Random Access Memory) 107 serving as a memory, an oscillation circuit 108, a modulation unit 109, and a power generation unit 110. The data management device 14 is configured to include a control unit 111 and a recording unit 112. The communication processing device 13 is communicable to the data management device 14 arranged with the recording unit 112 recorded with data, and relays the readout of the data from the data management device 14 by the reader/writer 11.

The antenna 101 receives the request signal transmitted from the reader/writer 11, and provides the received request signal to the demodulation unit 102. The antenna 101 transmits the response signal provided from the modulation unit 109 to the reader/writer 11 by wireless communication. In other words, the antenna 101 radiates the electric wave for transmitting the response signal provided from the modulation unit 109. At the antenna 101, resonance occurs by the electric wave of a predetermined frequency radiated from the reader/writer 11, thereby generating electromotive force.

The demodulation unit 102 demodulates the request signal provided from the antenna 101 through a demodulation method corresponding to the modulation method of the modulation unit 34 (see FIG. 10), and provides the demodulated request signal to the SPU 103. For instance, the demodulation unit 102 envelope detects the request signal or the ASK modulation wave received via the antenna 101 and demodulates the same, and outputs the demodulated request signal to the SPU 103.

The SPU 103 decodes the request signal provided from the demodulation unit 102 through a predetermined method, and provides the decoded request signal to the control unit 104. The SPU 103 codes the response signal provided from the control unit 104 by a predetermined coding method, and provides the coded response signal to the modulation unit 109. For instance, if the data demodulated in the demodulation unit 102 is coded by the Manchester method, the SPU 103 decodes the data (decode the Manchester code) based on the clock signal provided from a PLL (Phase Locked Loop) circuit (not shown), and provides the decoded data to the control unit 104. For instance, the SPU 103 codes the response signal provided from the control unit 104 by the Manchester method, and provides the coded response signal to the modulation unit 109.

The control unit 104 provides the decoded data to the recording unit 112 via the control unit 111.

When receiving the address update request signal including the segment identifier for identifying the segment address of the recording unit 112 via the antenna 101 from the reader/writer 11, the control unit 104 holds the received segment identifier in the RAM 107. When receiving the readout request signal including an offset address having the segment address as a reference via the antenna 101 from the reader/writer 11, the control unit 104 transmits to the reader/writer 11 the data recorded in a region specified by the address having the offset address contained in the readout request signal as offset with the segment address identified in the segment identifier as a reference, of the regions of the recording unit 112.

When receiving the write request signal via the antenna 101 from the reader/writer 11, the control unit 104 determines an address update flag contained in the received write request signal. The address update flag is contained in the write request signal, and is set with a value for updating address or a value for writing data. If determined that the value for updating the address is set in the address update flag, the write request signal is recognized as the address-update request signal. The existing write request signal then can be used as the address update request signal, whereby advantages such as development efficiency enhances are obtained.

The recording unit 112 is configured by a non-volatile memory such as flash memory, EEPROM, MRAM, or FeRAM, and is recorded with various data such as data to be transmitted to the reader/writer 11, and data desired for the execution of the program.

The RAM 107 appropriately stores data desired for the execution of the program, and the like. The RAM 107 provides the stored data to the control unit 104.

The oscillation circuit 108 generates a clock signal having the same frequency as the frequency of the request signal received by the antenna 101, and provides the generated clock signal to the modulation unit 109. For example, the oscillation circuit 108 incorporates a PLL circuit, and generates a clock signal having the same frequency as the clock frequency of the request signal.

The modulation unit 109 generates a carrier wave based on the clock signal of a predetermined frequency provided from the oscillation circuit 108. The modulation unit 109 modulates the response signal provided from the SPU 103 through a predetermined method based on the carrier wave to generate the response signal, and provides the modulated response signal to the antenna 101. For instance, the modulation unit 109 further ASK modulates the response signal coded by the Manchester method provided from the SPU 103, and transmits the modulated response signal to the reader/writer 11 via the antenna 101.

The modulation unit 109 turns ON/OFF a predetermined switching element (not shown) with respect to the response signal provided from the SPU 103, and connects a predetermined load in parallel to the antenna 101 only when the switching element is in the ON state to fluctuate the load of the antenna 101. The ASK modulated response signal is transmitted to the reader/writer 11 via the antenna 101 by the fluctuation of the load of the antenna 101 (fluctuate terminal voltage of the antenna 36 of the reader/writer 11).

The power generation unit 110 generates a direct current (DC) power based on the alternating current (AC) electromotive force generated at the antenna 101, and supplies the generated DC power to each unit of the data management system 12.

FIG. 12 is a view showing a configuration of the address update request according to the present embodiment. The configuration of the address update request according to the present embodiment will be described with reference to FIG. 12.

The address update request (Update_Req) has a configuration shown in FIG. 12, and an identifier for specifying the memory segment (of the recording unit 112) is substituted to the memory segment identifier (also simply referred to as "segment identifier"). The reader/writer 11 transmits the address update request (Update_Req) to the communication processing device 13, where when the communication processing device 13 receives the request, the communication processing device 13 holds the memory address complying with the memory segment identifier in the RAM 107, and returns the address update response (Update_Res). The communication processing device 13 interprets the subsequent readout request (Read_Req) as the readout of the data in the held memory segment. In other words, the communication processing device 13 sets the memory segment identifier as the segment address, and the block number of the readout request (Read_Req) as the offset address.

In one example, the configuration in which the block data (DATA) of the write request (Write_Req) is substituted to the memory segment identifier is used as the address update request (Update_Req).

Figure 13:
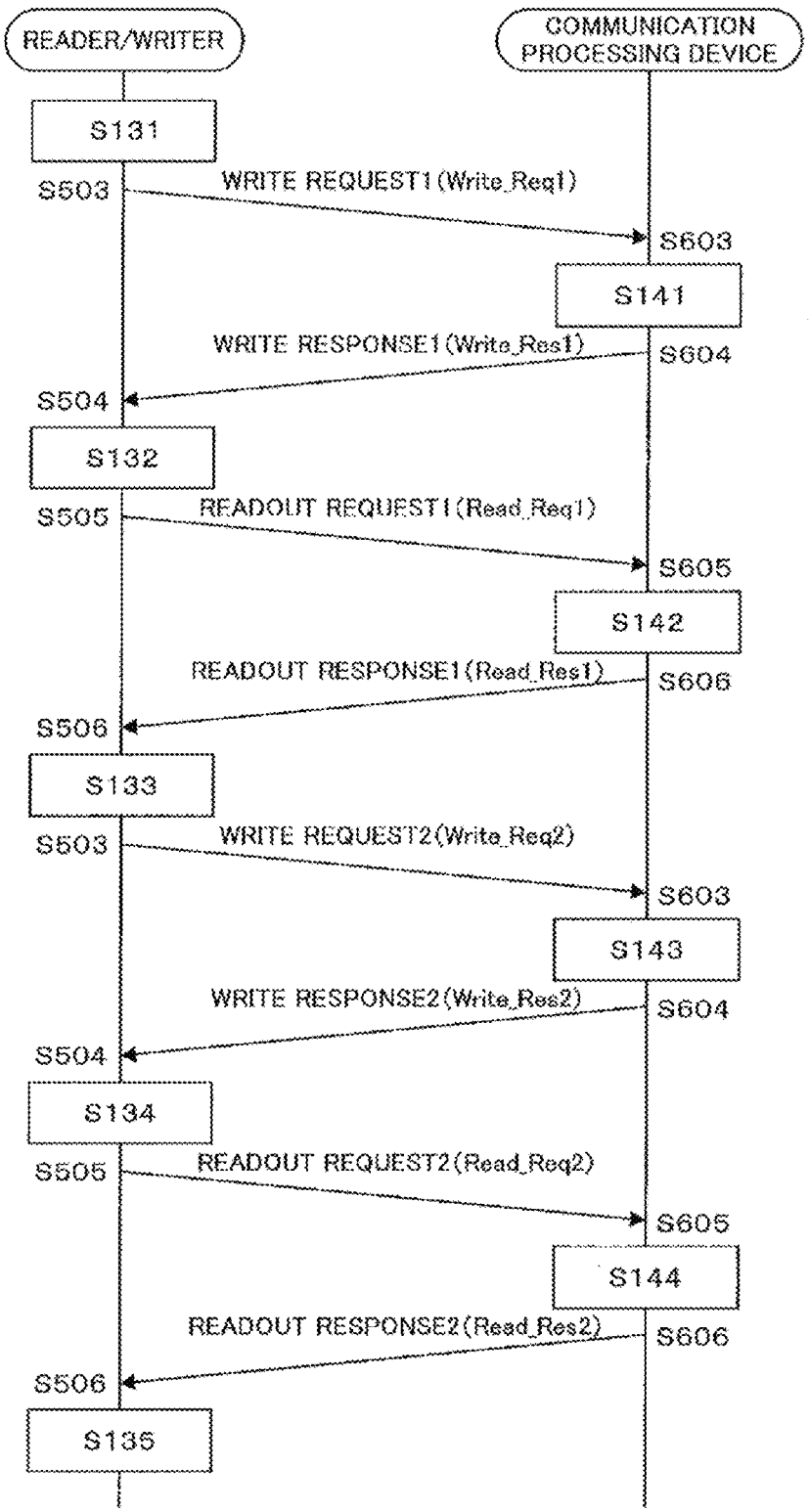
FIG. 13 is a sequence chart showing the flow of process of the communication system according to an embodiment.

FIG. 13 is a sequence chart showing the flow of process of the communication system according to the present embodiment. The flow of process of the communication system according to the present embodiment will be described with reference to FIG. 13.

The entire command sequence is, for example, as shown in FIG. 13. The reader/writer 11 alternately repeats transmission of the write request and the transmission of the readout request with respect to the communication processing device 13.

Figure 14:
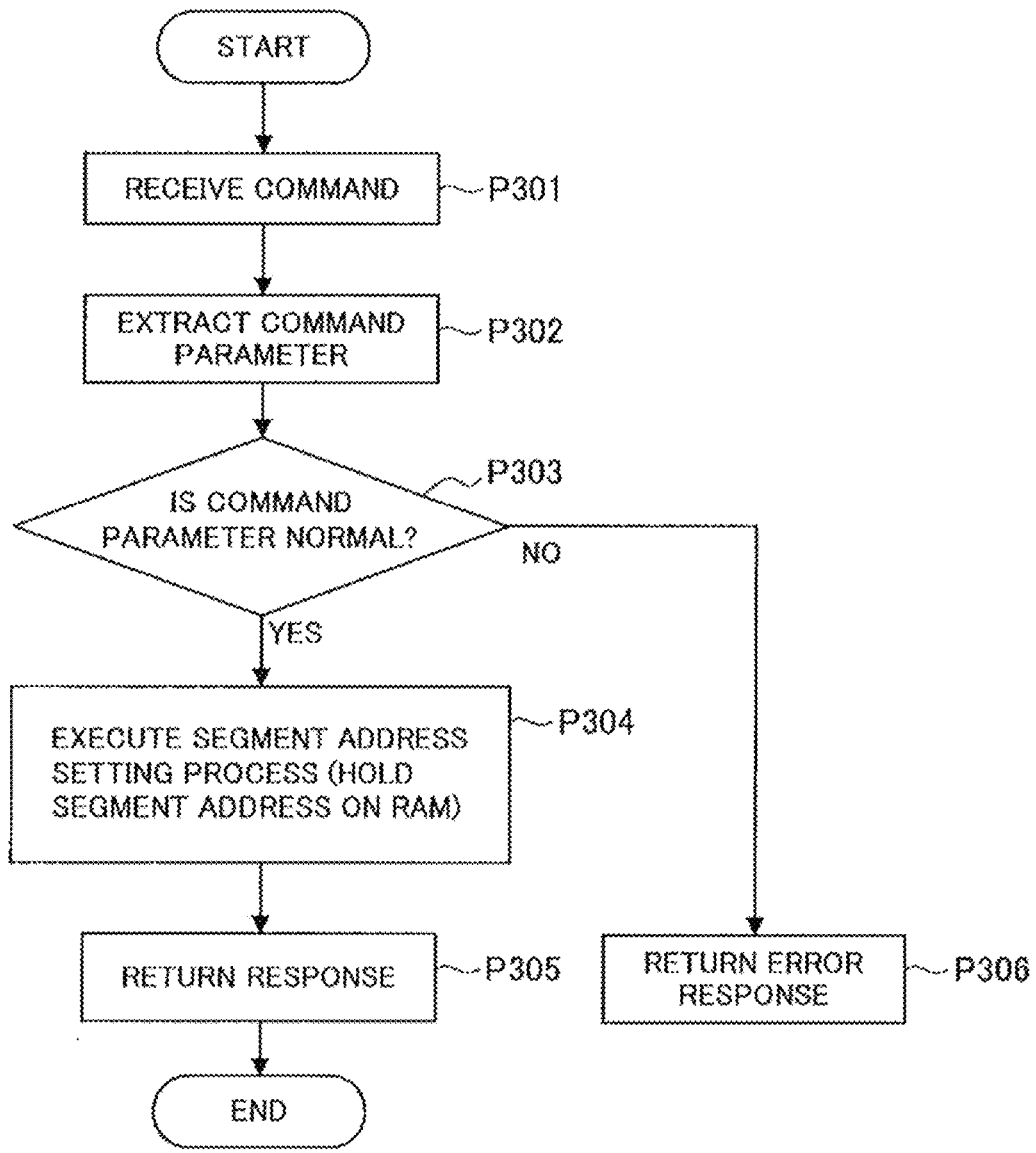
FIG. 14 is a flowchart showing the flow of the write request processing of the communication system according to an embodiment.

FIG. 14 is a flowchart showing the flow of the write request processing of the communication system according to the present embodiment. The flow of the write request processing of the communication system according to the present embodiment will be described with reference to FIG. 14.

The communication processing device 13 holds the segment address provided in the parameter in the RAM 107 in the process of receiving the write request 1 (Write_Req1) (S141), and the process of receiving the write request 2 (Write_Req2) (S143) instead of executing the write processing, as opposed to the case shown in FIG. 8.

Figure 15:
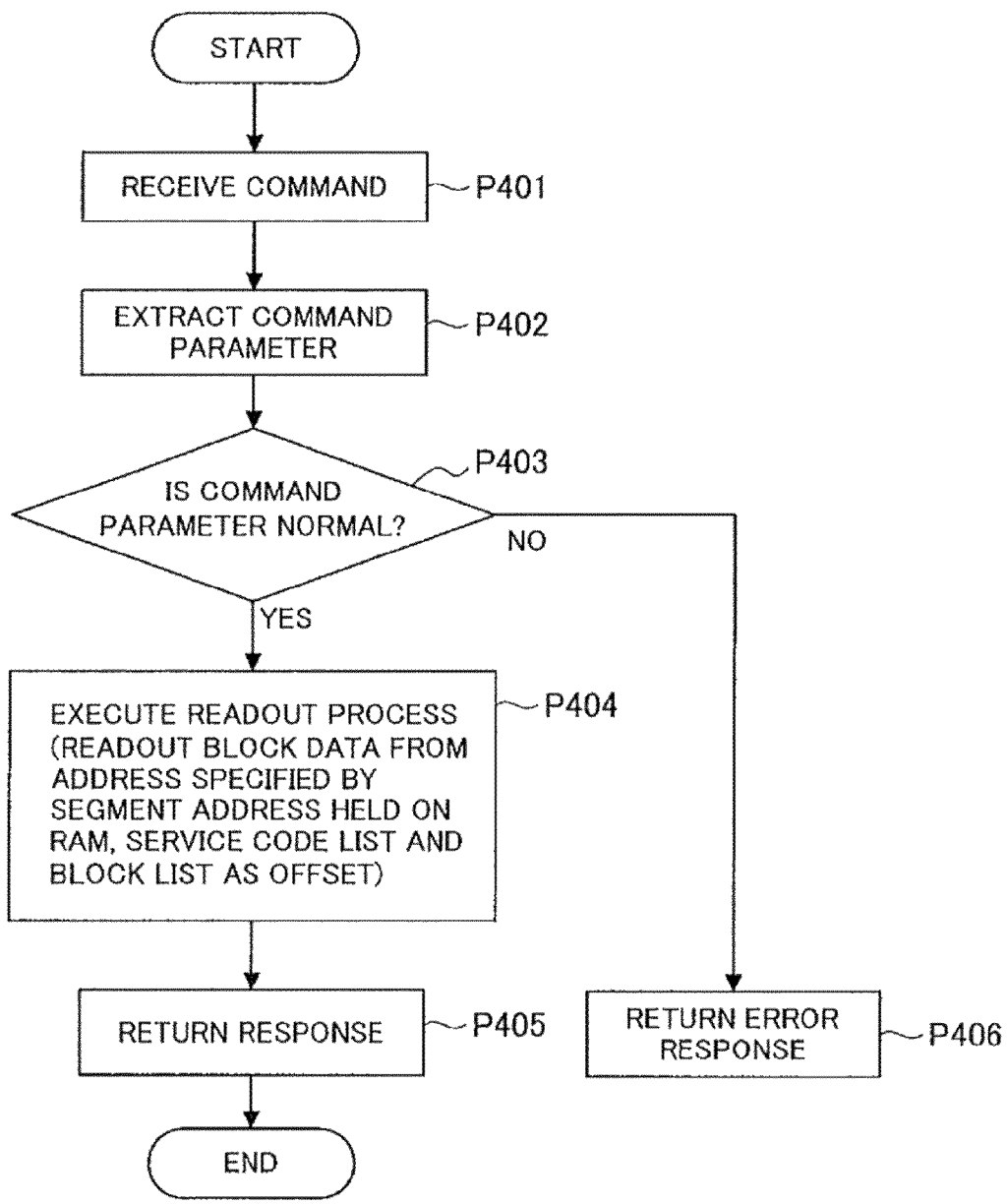
FIG. 15 is a flowchart showing the flow of the readout request processing of the communication system according to an embodiment.

FIG. 15 is a flowchart showing the flow of the readout request processing of the communication system according to the present embodiment. The flow of the readout request processing of the communication system according to the present embodiment will be described with reference to FIG. 15.

The communication processing device 13 reads out the block data having the segment address held on the RAM 107 as the segment and the memory address specified by the service code list and the block list of the command parameter as the offset, and returns the same as the parameter of the readout response (Read_Req) when executing the readout processing in the process of receiving the readout request 1 (Read_Req1) (S142), and the process of receiving the readout request 2 (Read_Req2) (S144), as opposed to the case shown in FIG. 6.

Figure 16:
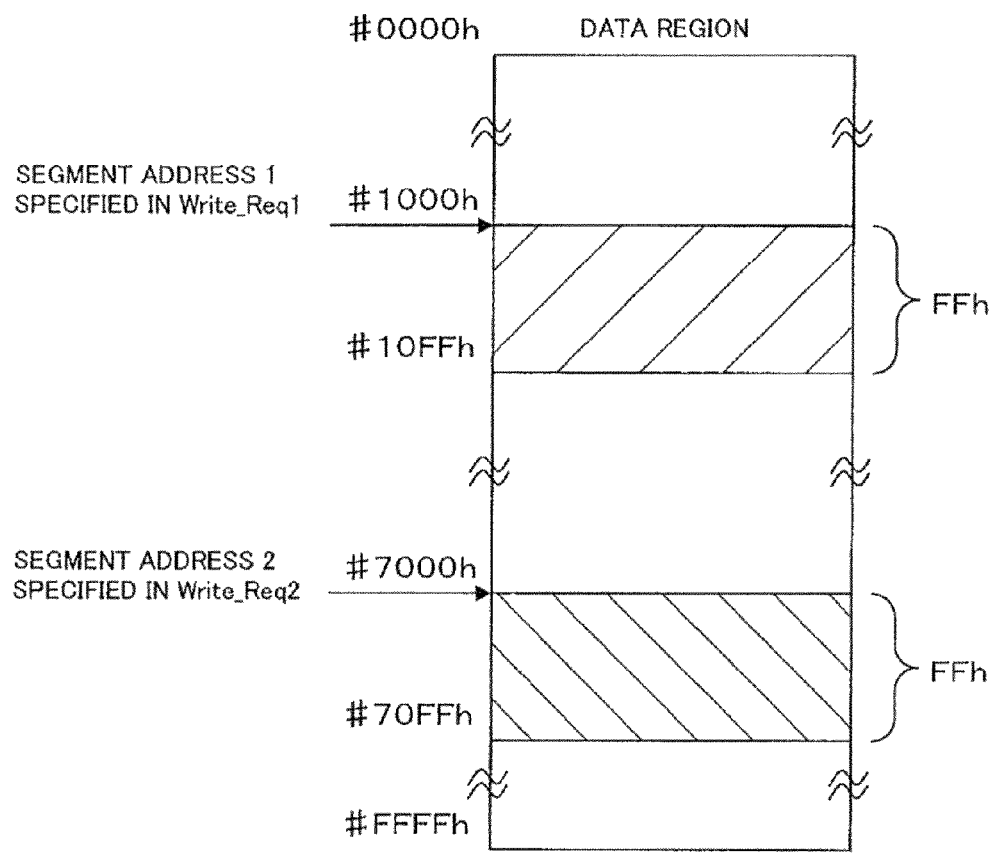
FIG. 16 is a schematic view showing the state of the memory access with respect to the recording unit of the data management device according to an embodiment.

FIG. 16 is a schematic view showing the state of the memory access with respect to the recording unit of the data management device according to the present embodiment. The memory access with respect to the recording unit of the data management device according to the present embodiment will be described with reference to FIG. 16.

In the sequence chart shown in FIG. 13, the reader/writer 11 specifies a segment address 1 (#1000h) with the parameter of the write request 1 (Write_Req1), and specifies a segment address 2 (#7000h) with the parameter of the write request 2 (Write_Req2). In this case, when receiving the readout request 1 (Read_Req1), the communication processing device 13 can access the data in the range of #1000h to #10FFh in which the block number of the parameter of the readout request 1 (Read_Req1) is offset to the segment address 1 held when receiving the write request 1 (Write_Req1) immediately before. When receiving the readout request 2 (Read_Req2), the communication processing device 13 can access the data in the range of #7000h to #70FFh in which the block number of the parameter of the readout request 2 (Read_Req2) is offset to the segment address 2 held when receiving the write request 2 (Write_Req2) immediately before.

Figure 17:
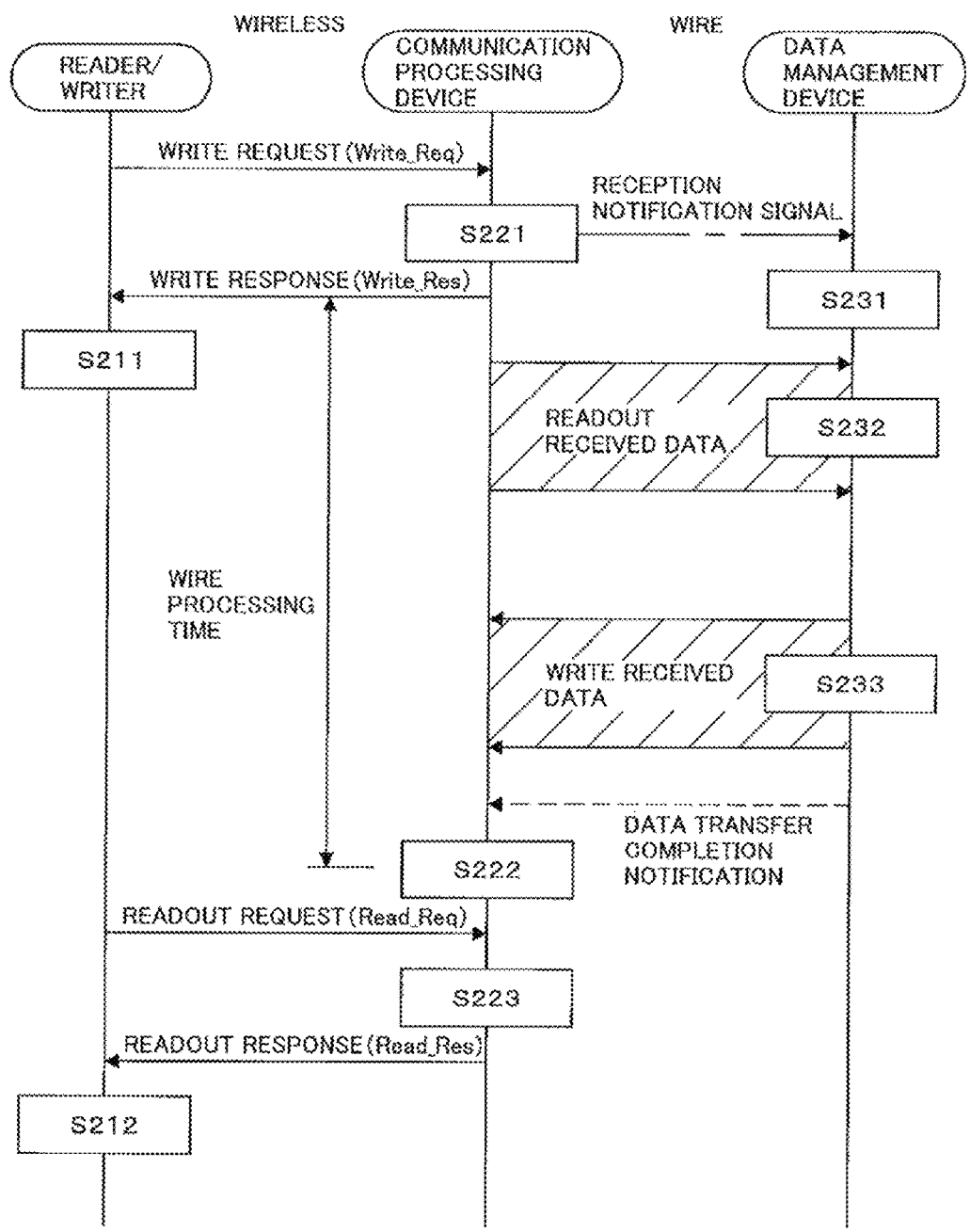
FIG. 17 is a sequence chart of a case using a proposed method with respect to the system configuration shown in FIG. 1.

FIG. 17 is a sequence chart of a case using a proposed method with respect to the system configuration shown in FIG. 1.

In the system configuration shown in FIG. 1, the maximum number of blocks that can be stored in the buffer region 913 of the communication processing LSI 912 all at once is set as 12 blocks (192 bytes). (This maximum value originates from the standard of specifying the LEN field indicating the length of the packet data as one byte in terms of the format of the wireless communication packet).

In the case of the proposed method, the reader/writer 900 specifies the identifier or the segment address representing the data desired in the next readout request in the parameter of the write request (Write_Req). In S221, the communication processing LSI 912 transmits a wireless data reception notification to the data management LSI 914. The data management LSI 914 receiving the wireless data reception notification in S231 functions as the master IC of the SPI and reads out the number of blocks (NOB), the block list (BLST), and the block data (DATA) stored in the buffer region 913 of the communication processing LSI 912 using the SPI interface in S232.

The data management LSI 914 specifies the data to read out according to the read data, and reads out the data from the recording unit (NVM). Thereafter, in S233, the data management LSI 914 writes the read data to the buffer region 913 of the communication processing LSI 912 via the SPI interface, and sends the wire data transfer completion notification. In S222, the communication processing LSI 912 recognizing the wire data transfer completion notification waits for the response of the wireless command. The reader/writer 900 assumes the time necessary for processing on the wire side from the time point of S211 of when receiving the write response (Write_Res) as the wire processing time, and transmits the readout request (Read_Req) after waiting. The communication processing LSI 912 receiving the readout request (Read_Req) reads out the data stored in the buffer region 913 and returns the same as the block data (DATA) of the readout response (Read_Res) in S223.

As described above, in the information processing device in which the communication processing LSI 912 and the data management LSI 914 are separated, even if the read data in the data management LSI 914 is set in the communication processing LSI 912 in advance, the data exceeding the size of the buffer region 913 (RAM) of the communication processing LSI 912 can be handled by the readout request (Read_Req) on the buffer region 913 of one information processing device.

A significant effect is obtained in that the device (reader/writer) for performing data transmission and reception with the electronic device having the non-contact IC card interface function according to one embodiment can access a large-capacity memory (i.e., recording unit 915 arranged in the communication device 910 in FIG. 1) of the electronic device, and perform transmission and reception of data stored in the large-capacity memory via the interface of the non-contact IC card function.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A reader/writer comprising:
   an antenna for transmitting and receiving signals with a communication processing device communicable with a data management device including a recording unit recorded with data, the communication processing device relaying readout of data from the recording unit; and
   a control unit for:
   generating an address update request signal including a segment identifier for identifying a segment address of the recording unit,
   transmitting the address update request signal to the communication processing device via the antenna, and thereafter,
   generating a readout request signal including an offset address having the segment address identified in the segment identifier as a reference, and
   transmitting the readout request signal to the communication processing device via the antenna causing the communication processing device to set the reference as the segment identifier and access the data associated with the segment address combined with the offset address,
   wherein the offset address includes a service code list and a block list of the recording unit.

2. A communication processing device comprising:
   an antenna for transmitting and receiving signals with a reader/writer; and
   a control unit for:
   when receiving an address update request signal including a segment identifier for identifying a segment address of a recording unit of a data management device, which includes the recording unit recorded with data, via the antenna from the reader/writer, holding the segment identifier in a memory, and
   when receiving a readout request signal including an offset address having the segment address as a reference via the antenna from the reader/writer, transmitting to the reader/writer data recorded in a region specified by an address having the offset address contained in the readout request signal as offset with the segment address identified in the segment identifier as a reference of the regions of the recording unit,
   wherein the offset address includes a service code list and a block list of the recording unit.

3. The communication processing device according to claim 2,
   wherein when receiving a write request signal via the antenna from the reader/writer, the control unit determines an address update flag contained in the write request signal, and recognizes the write request signal as the address update request signal when determining that a value for address update is set to the address update flag.

4. A communication processing method executed by a control unit of a communication processing device, the method comprising the steps of:
   holding, when receiving an address update request signal including a segment identifier for identifying a segment address of a recording unit of a data management device, which includes the recording unit recorded with data, via an antenna from a reader/writer, the segment identifier in a memory; and
   transmitting, when receiving a readout request signal including an offset address having the segment address as a reference via the antenna from the reader/writer, to the reader/writer data recorded in a region specified by an address having the offset address contained in the readout request signal as offset with the segment address identifier in the segment identifier as a reference of the regions of the recording unit,
   wherein the offset address includes a service code list and a block list of the recording unit.

5. A data management system comprising:
   a data management device including a recording unit recorded with data; and
   a communication processing device including:
   an antenna for transmitting and receiving signals with a reader/writer, and
   a control unit for:
   when receiving an address update request signal including a segment identifier for identifying a segment address of the recording unit via the antenna from the reader/writer, holding the segment identifier in a memory, and
   when receiving a readout request signal including an offset address having the segment address as a reference via the antenna from the reader/writer, transmitting to the reader/writer data recorded in a region specified by an address having the offset address contained in the readout request signal as offset with the segment address identified in the segment identifier as a reference of the regions of the recording unit,
   wherein the offset address includes a service code list and a block list of the recording unit.

6. A communication system comprising:
   a data management device including a recording unit recorded with data;
   a reader/writer including an antenna for transmitting and receiving signals, and a control unit for generating an address update request signal including a segment identifier for identifying a segment address of the recording unit, transmitting the address update request signal to the communication processing device via the antenna, and thereafter, generating a readout request signal including an offset address having the segment address identified in the segment identifier as a reference, and transmitting the readout request signal to the communication processing device via the antenna; and
   a communication processing device including an antenna for transmitting and receiving signals with the reader/writer, and a control unit for, when receiving the address update request signal via the antenna from the reader/writer, holding the segment identifier contained in the address update request signal in a memory, and when receiving a readout request signal via the antenna from the reader/writer, transmitting to the reader/writer data recorded in a region specified by an address having the offset address contained in the readout request signal as offset with the segment address identified in the segment identifier as a reference of the regions of the recording unit,
   wherein the offset address includes a service code list and a block list of the recording unit.

* * * * *